(12) United States Patent
Piccirelli et al.

(10) Patent No.: US 12,552,089 B2
(45) Date of Patent: Feb. 17, 2026

(54) EXTRUSION HEAD FOR ADDITIVE MANUFACTURING, ADDITIVE MANUFACTURING SYSTEM AND METHOD

(71) Applicant: SAFRAN, Paris (FR)

(72) Inventors: Nicola Piccirelli, Moissy-Cramayel (FR); Benoît Bazin, Moissy-Cramayel (FR); Daniel Therriault, Quebec (CA); Thierry Lafrance, Quebec (CA); Francis Trudeau Lalonde, Quebec (CA)

(73) Assignee: SAFRAN, Paris (FR)

( * ) Notice: Subject to any disclaimer, the term of this patent is extended or adjusted under 35 U.S.C. 154(b) by 0 days.

(21) Appl. No.: 18/783,284

(22) Filed: Jul. 24, 2024

(65) Prior Publication Data

US 2024/0375345 A1     Nov. 14, 2024

Related U.S. Application Data

(62) Division of application No. 17/605,441, filed as application No. PCT/EP2020/059971 on Apr. 8, 2020, now Pat. No. 12,070,896.

(30) Foreign Application Priority Data

Apr. 23, 2019    (CA) ................................ CA 3041017

(51) Int. Cl.
*B29C 64/209*     (2017.01)
*B29C 64/118*     (2017.01)
(Continued)

(52) U.S. Cl.
CPC .......... *B29C 64/118* (2017.08); *B29C 64/209* (2017.08); *B29C 64/314* (2017.08);
(Continued)

(58) Field of Classification Search
CPC ............................ B29C 48/345; B29C 48/285
See application file for complete search history.

(56) References Cited

U.S. PATENT DOCUMENTS 3,865,535 A     2/1975  Langdon
3,895,984 A *   7/1975  Cone ........................ B05D 7/08
                                                      156/290
(Continued)

FOREIGN PATENT DOCUMENTS

CN        107000318 A         8/2017
WO      2017/152109 A1        9/2017
WO      2018/200518 A1       11/2018

OTHER PUBLICATIONS

International Search Report issued in PCT/EP2020/059971 on Jul. 17, 2020.

*Primary Examiner* — Matthew J Daniels
(74) *Attorney, Agent, or Firm* — Oblon, McClelland, Maier & Neustadt, L.L.P.

(57) ABSTRACT

An extrusion head for additive manufacturing includes an enclosure defining a supply chamber. The enclosure includes at least one inlet port opening into the supply chamber and configured to receive a material to be extruded under pressure and a plurality of extrusion nozzles. Each nozzle is in communication with the supply chamber and opens onto the exterior of the enclosure via an outlet orifice. The nozzles of the plurality of nozzles are arranged adjacent to one another with a determined spacing between each nozzle outlet orifice.

5 Claims, 6 Drawing Sheets

(51) Int. Cl.
*B29C 64/314* (2017.01)
*B33Y 10/00* (2015.01)
*B33Y 30/00* (2015.01)
*B33Y 40/10* (2020.01)

(52) U.S. Cl.
CPC .............. *B33Y 10/00* (2014.12); *B33Y 30/00* (2014.12); *B33Y 40/10* (2020.01)

(56) References Cited

U.S. PATENT DOCUMENTS

| | | |
|---|---|---|
| 4,015,926 A | 4/1977 | Nehmey |
| 2014/0314954 A1 | 10/2014 | Lewis |
| 2017/0157828 A1 | 6/2017 | Mandel et al. |
| 2019/0070786 A1 | 3/2019 | Lewis et al. |
| 2020/0147873 A1 | 5/2020 | Lewis et al. |

* cited by examiner

EXTRUSION HEAD FOR ADDITIVE MANUFACTURING, ADDITIVE MANUFACTURING SYSTEM AND METHOD

CROSS-REFERENCE TO RELATED APPLICATIONS

This application is a division of U.S. application Ser. No. 17/605,441 filed Oct. 21, 2021, the entire contents of which is incorporated herein by reference. U.S. application Ser. No. 17/605,441 is a 371 of International Application No. PCT/EP2020/059971 filed Apr. 8, 2020, and claims the benefit of priority from prior Canadian Application No. 3041017 filed Apr. 23, 2019.

TECHNICAL FIELD

The present invention relates to the field of additive manufacturing of a part or of a coating by the deposition of filaments of material placed side by side.

PRIOR ART

Additive manufacturing or modeling of a coating or of a part by filament deposition consists of extruding and depositing filaments of matter by placing them side by side, this over one or more layers.

One of the techniques of this type of manufacture uses previously melted materials, such as a thermoplastic material, and is known by the name of printing by fused filament deposition or FDM (for "Fused Deposition Modeling"). A method and an implementing apparatus of this technique are disclosed in particular in document U.S. Pat. No. 5,121,329.

This additive manufacturing technique can also be implemented with more viscous materials such as thermoset material which are deposited in the form of adjacent filaments, which are then polymerized in an oven.

However, in the case of viscous materials, the deposition speed of a strand or of a filament is relatively slow. The manufacturing time of a part or of a coating based on filaments of a material of this type is therefore very long.

In addition, in the case in particular of a coating, the thickness of the layer(s) to be formed can be small, which necessitates depositing filaments having a small diameter.

But if the filament deposited has a small diameter, the time to form a layer of material by setting the filaments side by side will be further extended.

There consequently exists a need to form coatings or parts by additive manufacturing by the deposition of filaments side by side with reduced manufacturing times, and this even when depositing filaments having a small diameter.

DISCLOSURE OF THE INVENTION

To this end, the present invention proposes an extrusion head for additive manufacturing comprising an enclosure defining a supply chamber, the enclosure including at least one inlet port opening into the supply chamber and configured to receive a material to be extruded under pressure and a plurality of extrusion nozzles, each nozzle being in communication with said supply chamber and opening onto the exterior of the enclosure via an outlet orifice, the nozzles of the plurality of nozzles being arranged adjacent to one another with a determined spacing between each nozzle outlet orifice.

The extrusion head of the invention allows simultaneous depositing of several adjacent filaments of material so as to form a strip of material in a single passage. The manufacturing time of a part or of a coating by additive manufacturing is thus greatly reduced.

According to a particular feature of the extrusion head of the invention, each nozzle of the plurality of nozzles includes an extrusion channel in direct communication with the supply chamber, the extrusion channel including a front portion having a passage cross section which shrinks progressively until the outlet orifice. With this geometry, the extrusion channels allow in particular achieving uniform flow rates of material extruded by the outlet orifices and improving the homogeneity of the filaments deposited simultaneously.

According to another particular characteristic of the extrusion head of the invention, the outlet orifice of each nozzle has a width comprised between 50 μm and 700 μm. It is thus possible to adjust the size of the extruded filaments, as well as the thickness of the strip of deposited material.

According to another particular characteristic of the extrusion head of the invention, the distance between two adjacent outlet orifices is comprised between 50 μm and 700 μm.

It is thus possible to control the thickness of strip of deposited material by adjusting the spreading space between the filaments.

According to another particular feature of the extrusion head of the invention, the plurality of nozzles is present on a removable element of the enclosure. This allows facilitating cleaning of the extrusion nozzles, particularly in the event that these are clogged.

The invention also has as its object an extrusion-based additive manufacturing system comprising a device for dispensing a material under pressure and an extrusion head according to the invention connected to the dispensing device, the dispensing device being configured to inject, under pressure, a material to be extruded into the supply chamber of the extrusion head.

The invention also has as its object an additive manufacturing method comprising the injection, under pressure, of a material to be extruded into a supply chamber of an extrusion head according to the invention, and the deposition of a plurality of filaments adjacent to one another by the extrusion head, the plurality of filaments forming a strip having a width corresponding substantially to the width over which the plurality of extrusion nozzles of the extrusion head extends.

BRIEF DESCRIPTION OF THE DRAWINGS

Other features and advantage of the invention will be revealed by the following description of particular embodiments of the invention, given by way of non-limiting examples, with reference to the appended drawings in which.

DESCRIPTION OF THE EMBODIMENTS

Figure 1A:
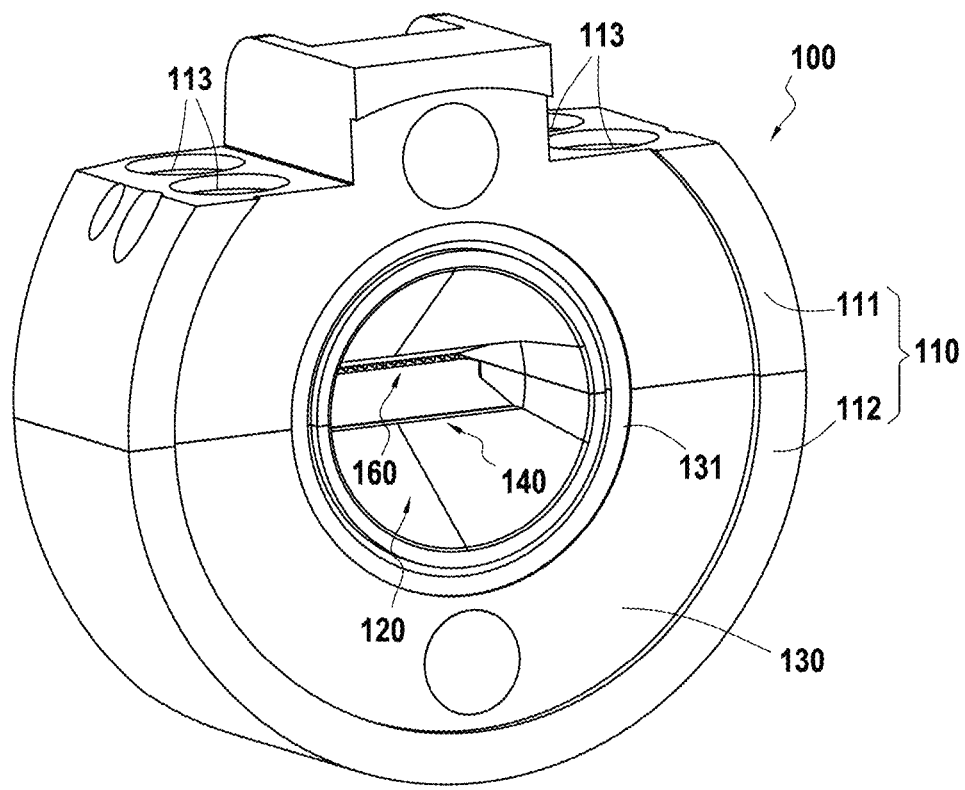
FIGS. 1A and 1B are schematic perspective views of an extrusion head in conformity with an embodiment of the invention.
Figure 1B:
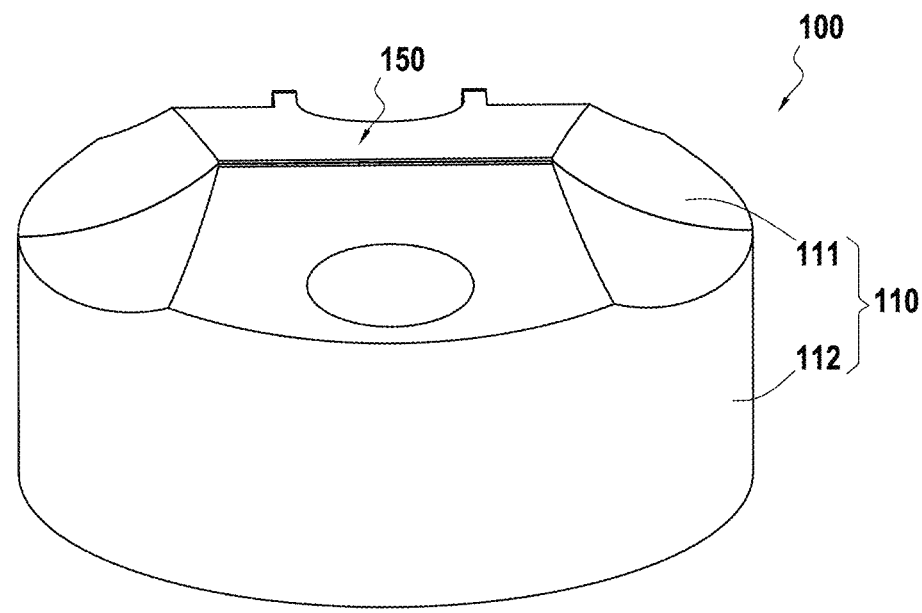
Figure 2:
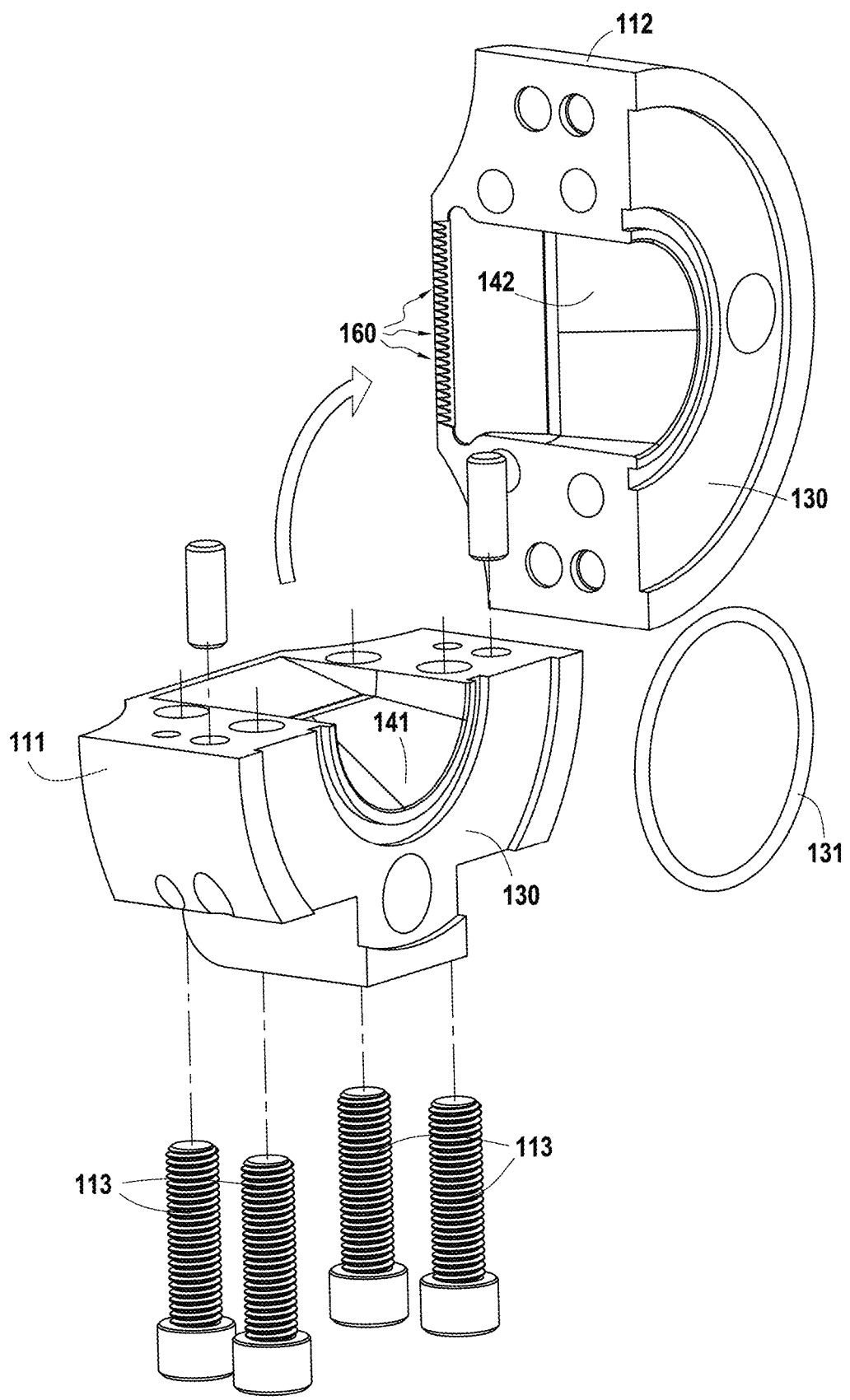
FIG. 2 is an exploded schematic view of the extrusion head of FIGS. 1A and 1B.

FIGS. 1A, 1B and 2 show an extrusion head 100 for additive manufacturing in conformity with an embodiment of the invention. The extrusion head 100 comprises an enclosure 110 constituted, in the example described here, of first and second semi-annular portions 111 and 112 attached together by clamping screws 113. The enclosure 110 can in particular be made of steel. The extrusion head 100 includes, in its upper portion, an inlet port 120 surrounded by a fastening baseplate 130. The inlet port 120 is intended to be connected at an outlet of a supply device 200 (FIG. 5) configured to supply the extrusion head with a material to be extruded under pressure. The head is fastened hermetically to the supply device 200 via the fastening baseplate 130 with the interposition of a high-pressure gasket 131.

The enclosure 110 defines a supply chamber 140 which extends between the inlet port 120 and a distribution outlet 150. More precisely, as illustrated in particular in FIGS. 1A and 2, the supply chamber 140 includes first and second sloping walls 141 and 142, present respectively on the first and second semi-annular portions 111 and 112 of the enclosure 110. The sloping walls 141 and 142 form together a duct in the supply chamber, the passage section of which shrinks progressively between the inlet port 120 and the distribution outlet 150 of the supply chamber 140. This geometry allows facilitating the extraction of viscous materials.

Figure 3:
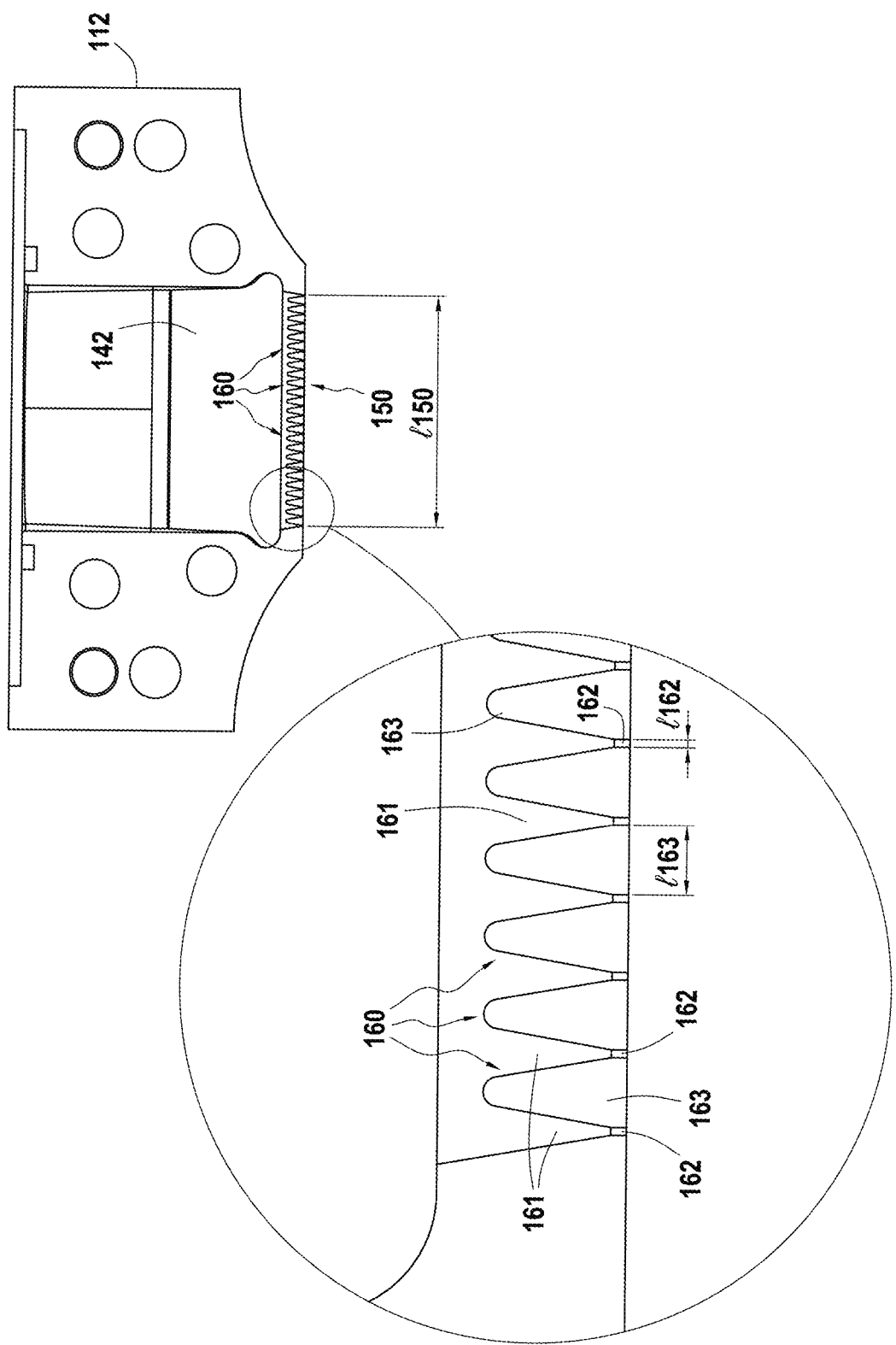
FIG. 3 is a schematic section view of the extrusion head of FIGS. 1A and 1B.
Figure 4:
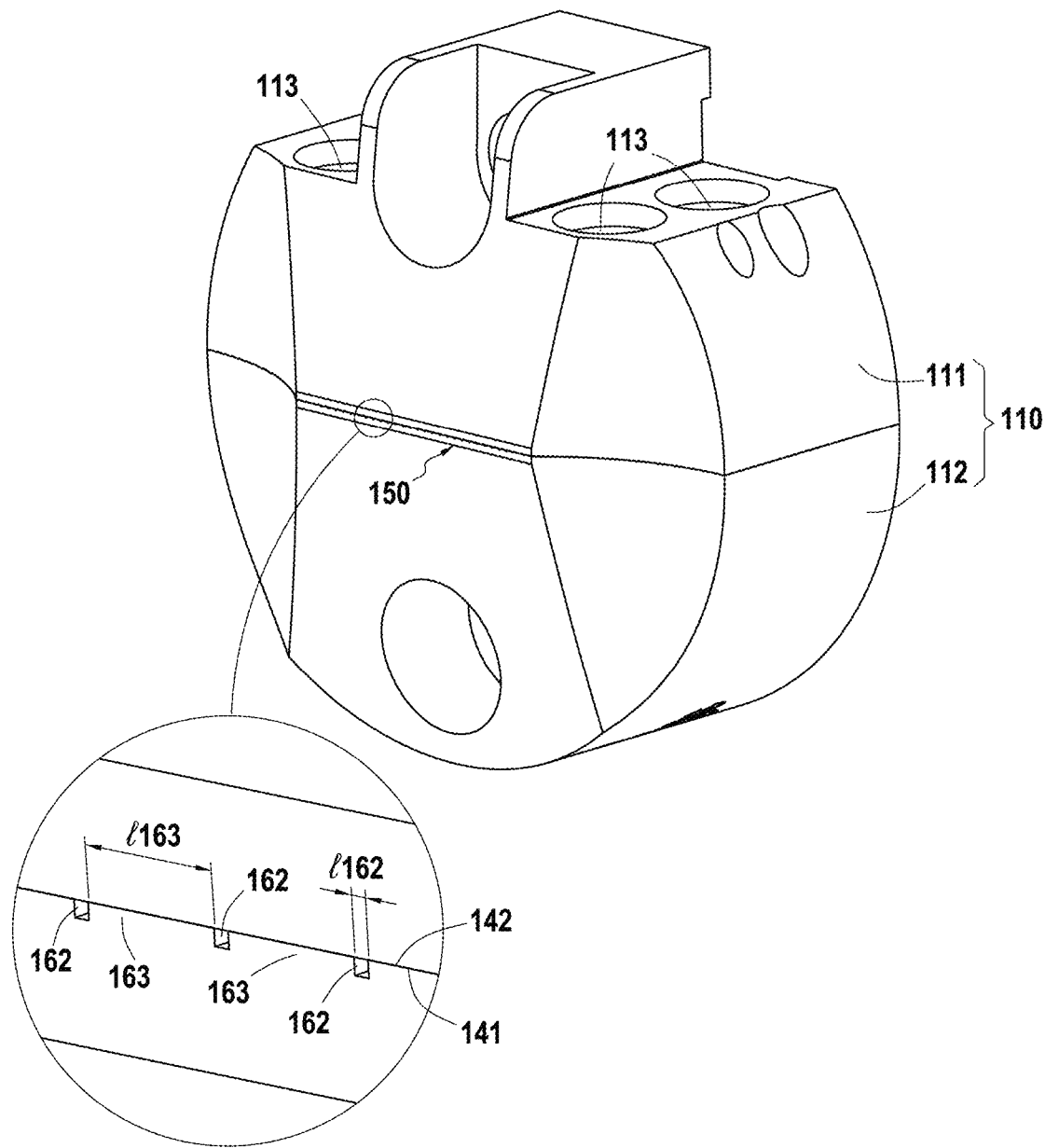
FIG. 4 is a schematic perspective view showing the distribution outlet of the extrusion head of FIGS. 1A and 1B.

In conformity with the invention, the distribution outlet 150 comprises a plurality of extrusion nozzles 160. As illustrated in FIGS. 3 and 4, each extrusion nozzle 160 comprises an extrusion channel 161 in direct communication with the supply chamber 140 and an outlet orifice 162 at a distal portion of the extrusion channel.

The extrusion nozzles 160 are arranged adjacent to one another over the entire length of the distribution outlet 150. The nozzles 160 are aligned in a rectilinear direction. In the example described here, the extrusion channels 161 and the outlet orifices 162 of the nozzles 160 are formed at a lower edge 1420 of the wall 142 of the second semi-annular portion 112, for example by machining in the thickness of the wall by laser engraving. During the assembly of the first and second semi-annular portions 111 and 112 of the enclosure 110, a lower edge 1410 of the wall 141 of the first semi-annular portion 111 is pressed on excess thickness portions 163 present between each nozzle 160 on the lower edge 1420, these excess thickness portions corresponding to the un-machined portions of the edge 1420. The lower edge 1410 covers the extrusion channels 161 and the outlet orifices 162 which then constitute the only passages at the distribution outlet 150. As described hereafter, the plurality of nozzles 160 allows dispensing simultaneously a plurality of adjacent filaments.

The extrusion channels 161 have a passage cross section which shrinks progressively between the internal volume of the supply chamber 140 and the outlet orifices 162, which facilitates in particular the extrusion of viscous materials.

Still as illustrated in FIGS. 3 and 4, the outlet orifices 162 have a determined width $I_{162}$ which defines the width or the diameter of the filaments deposited by the extrusion head 100. The outlet orifices 162 of the nozzles 160 have a width $I_{162}$ comprised between 50 µm and 700 µm.

The distance or the spacing between each outlet orifice 162 which defines the distance between the adjacent filaments deposited by the extrusion head 100 is determined by the width $I_{163}$ of the excess thickness portions 163 present between the two outlet orifices 162. The distance $I_{163}$ between two adjacent outlet orifices 162 is comprised between 50 µm and 700 µm.

The distance $I_{163}$ is defined depending on the width or the diameter of the deposited filaments and on the desired spacing between the deposited filaments. The distance $I_{163}$ can be defined so that the deposited filaments are in contact with one another or, on the contrary, so as to provide a determined spacing between the deposited filaments. In the latter case, the distance $I_{163}$ allows controlling the porosity of coatings or of manufactured parts.

Figure 5:
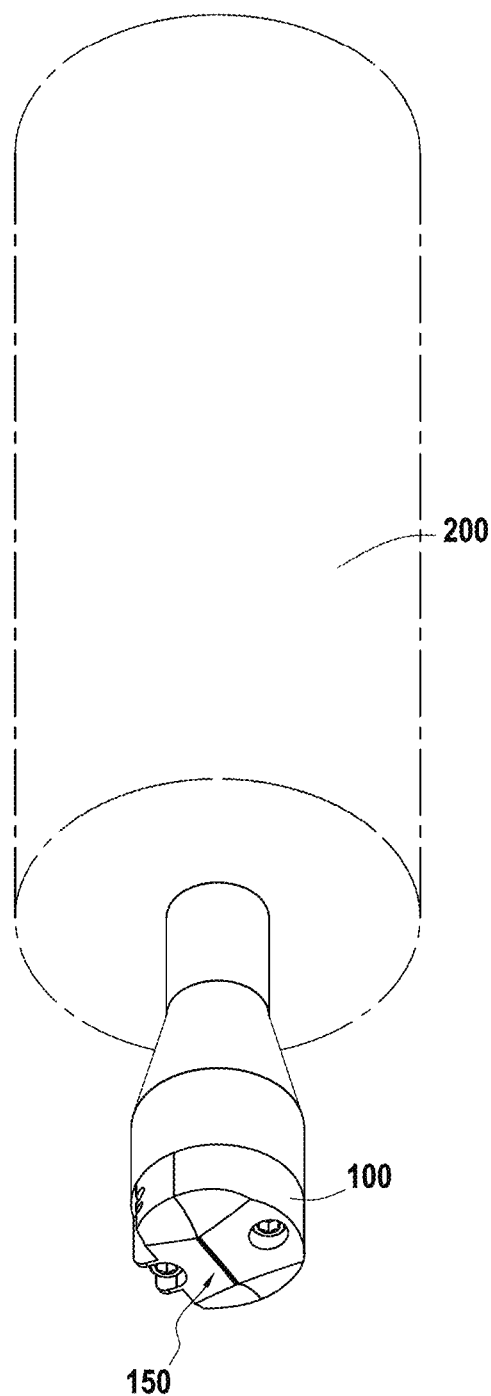
FIG. 5 is a schematic perspective view of an additive manufacturing system provided with the extrusion head of FIGS. 1A and 1B.

As illustrated in FIG. 5, the extrusion head 100 is intended to be coupled to a dispensing device 200 configured to inject, under pressure, a material to be extruded into the supply chamber 140 of the head 100 via the inlet port 120. The device 200 comprises for example a hydraulic piston (not shown in FIG. 5) configured to exert a sufficient force on the viscous material to extrude the material through the nozzles 160.

Figure 6:
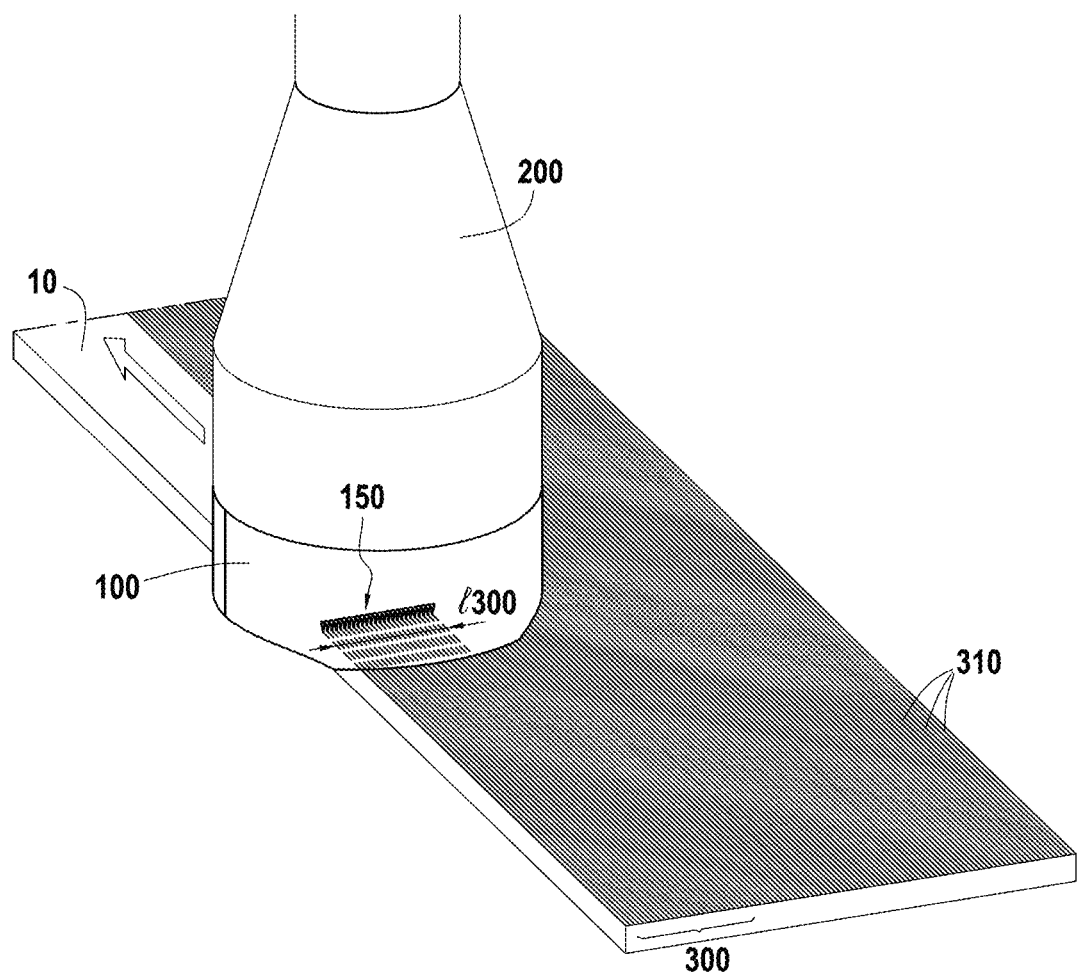
FIG. 6 is a schematic perspective view showing the simultaneous deposition of a strip of filaments by the extrusion head of FIGS. 1A and 1B.

FIG. 6 shows the deposition of adjacent layers or strips 300, each formed by a single passage of the extrusion head 100 on a surface 10. Each strip 300 is constituted of a plurality of filaments or strands 310 deposited simultaneously on the surface 10 by the extrusion nozzles 160 present at the distribution outlet 150 of the head 100. The width $I_{300}$ of a strip 300 (FIG. 6) corresponds to the width $I_{150}$ over which the plurality of extrusion nozzles 160 extends (FIG. 3).

The material extruded by the head 100 can be of different natures. It can in particular consist of a thermoset resin, with fillers or not.

As previously described, the enclosure 110 of the extrusion head 100 can be dismantled because it is formed by semi-annular portions 111 and 112 fastened together by clamping screws 113. The plurality of nozzles 160 is present on the second portion 112 which is removable. This allow facilitating the cleaning of the nozzles 160, particularly in the event that these are clogged.

However, the enclosure of the extrusion head defining the supply chamber and including the plurality of extrusion nozzles can also be produced in a single piece, by additive manufacturing for example.

The surface 10 can correspond to a substrate for the manufacture of a part by additive manufacturing or to a surface of a part for which it is desired to form a coating by additive manufacturing.

The extrusion head of the invention allows depositing simultaneously several adjacent filaments of material so as to form a strip of material in a single passage. The extrusion head can be used to deposit strips of material on surfaces of different geometries and of warped surfaces in particular.

The invention claimed is:

1. An additive manufacturing method comprising:
   injecting under pressure of a material to be extruded into
      a supply chamber of an extrusion head including
         an enclosure defining the supply chamber, the enclosure including at least one inlet port opening into the supply chamber and configured to receive a material to be extruded under pressure, and
         a plurality of extrusion nozzles, each nozzle being in communication with the supply chamber and opening onto an exterior of the enclosure via an outlet orifice, the nozzles of the plurality of nozzles being arranged adjacent to one another with a determined spacing between each nozzle outlet orifice, wherein the enclosure is formed by a first and second semi-annular portions fastened together by clamping screws and the plurality of extrusion nozzles is present on one of the first and second semi-annular portions which is removable, wherein the supply chamber includes first and second sloping walls present respectively on the first and second semi-annular portions of the enclosure, and wherein the first and second sloping walls form together a duct in the supply chamber, and a passage section of which shrinks progressively between the inlet port and a distribution outlet of the supply chamber; and depositing a plurality of filaments adjacent to one another by the extrusion head, the plurality of filaments forming a strip having a width corresponding substantially to the width over which the plurality of extrusion nozzles of the extrusion head extends.

2. The method according to claim 1, wherein each nozzle of the plurality of nozzles comprises an extrusion channel in direct communication with the supply chamber, the extrusion channel including a front portion having a passage cross section which shrinks progressively until the outlet orifice.

3. The method according to claim 1, wherein the outlet orifice of each nozzle has a width comprised between 50 μm and 700 μm.

4. The method according to claim 1, wherein the distance between two adjacent outlet orifices is comprised between 50 μm and 700 μm.

5. The method according to claim 1, wherein the plurality of nozzles is present on a removable element of the enclosure.

* * * * *